Feb. 11, 1958 K. WATANABE ET AL 2,822,939
ALUMINA CHARGING HOPPER TRUCK
Filed Nov. 14, 1955 2 Sheets-Sheet 1

INVENTORS
KOICHI WATANABE
AND KOSUKE ASANO
BY William D. Carothers
THEIR ATTORNEY

United States Patent Office 2,822,939
Patented Feb. 11, 1958

2,822,939
ALUMINA CHARGING HOPPER TRUCK

Koichi Watanabe and Kosuke Asano, Ihara-gun, Shizuoka-ken, Japan, assignors to Nippon Light Metal Co., Ltd., Tokyo, Japan, a company of Japan Application November 14, 1955, Serial No. 546,704

Claims priority, application Japan April 25, 1955

6 Claims. (Cl. 214—83.36)

This invention relates in general to an alumina charging truck and more particularly to an alumina charging truck to supply alumina to aluminium reduction pots.

It is desirable that such alumina charging trucks have a large carrying capacity of alumina and charge alumina quickly and uniformly to the electrolytic bath of the pots. An alumina charging truck hitherto generally used comprises, for example, a movable truck, and an alumina container installed thereon, alumina being charged to the aluminium reduction pots through an opening at the bottom of said container by means of a conveyor (e. g. screw conveyer) which conveys alumina horizontally. With such structure, it is necessary to place the extremity of the conveyer higher than the top of the shell of the pots. It follows therefore that the center of gravity of the charging truck also goes up higher and the truck is made unstable during its running. In order to keep the stability of the charging truck, carrying capacity must be reduced. Furthermore, it is necessary to make the charged alumina cover the surface of the bath uniformly. With the structure above-mentioned, the charged alumina is apt to pile up at the places where it is charged, and such charged alumina must be smoothed by man-power over the surface of the bath after each charge.

An object of the invention is the provision of an alumina charging truck with a low center of gravity of its own, having stability during its running and also having a large carrying capacity of alumina.

Another object of the invention is to cover the surface of the bath quickly and uniformly with alumina, irrespective of the character of the grains of alumina powder.

Other objects and a fuller understanding of the invention may be had by referring to the following description and claims, taken in conjunction with the accompanying drawings in which:

Figure 1:
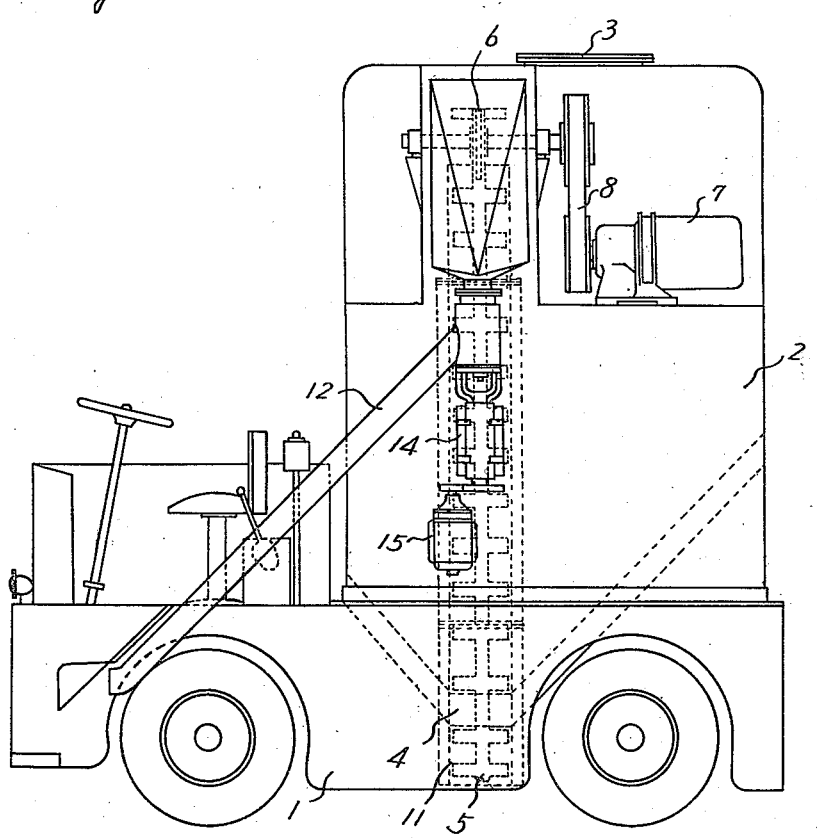
Fig. 1 is a front view of one embodiment of the invention.
Figure 2:
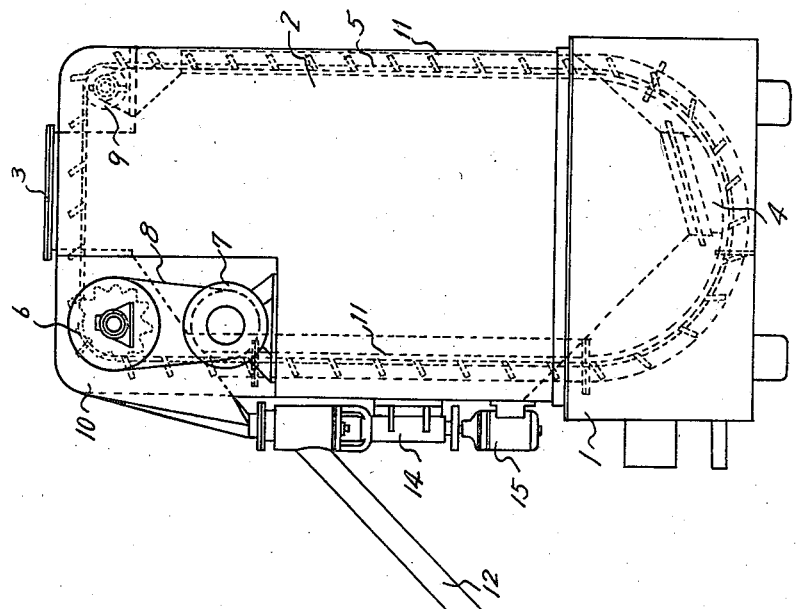
Fig. 2 is a side view thereof.
Figure 3:
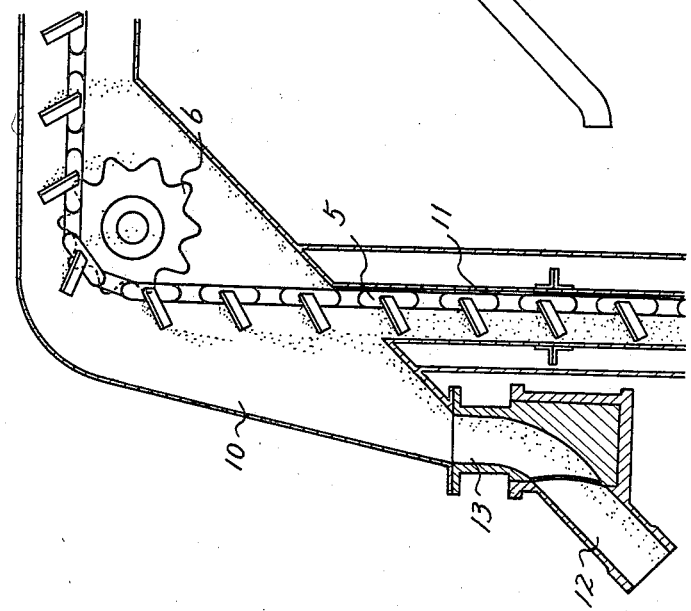
Fig. 3 is a sectional view of the air mixing room which is an important part of the structure in accordance with the invention.

With reference to the drawings, 1 is a truck which can run freely; 2 is an alumina container placed on the truck; 3 is an alumina feeding hole at the upper part of the container 2; 4 is an alumina outlet at the bottom of the container 2; 5 is a chain conveyer which circulates around the inner wall of the container; 6 is a sprocket wheel which drives the chain conveyer 5; and 7 and 8 are respectively a motor having a reduction gear, and an interlocking device, which make the sprocket wheel rotate. 9 is a guide roller which supports the chain conveyer 6 and changes its direction. 10 is an air mixing room in which alumina is mixed with air. 11 is a casing of the chain conveyer 5; 12 is a chute pipe; and 13 is a cock which automatically opens or closes depending upon whether the chute pipe 12 is over the pot or not. 14 and 15 are respectively a shaft bearing and a geared down motor, for changing the direction of the chute pipe 12.

After alumina is charged into the alumina container 2 on the truck 1 through the alumina feeding hole 3, the truck is moved to the side of a certain aluminium electrolytic reduction pot. The extremity of the chute pipe 12 which is set at the side of the truck 1 is moved towards the pot by the motor 15 and the shaft bearing 14. The cock 13 between the chute pipe 12 and the air mixing room 10 is opened. Then, alumina is put on the chain conveyer 5 from the alumina outlet 4 and is raised up to the inlet of the air mixing room 10 through the casing 11 by circulating the chain conveyer 5. The circulation of the chain conveyer is carried out by the rotation of the motor 7 and the interlocking device 8 which make the sprocket wheel rotate. Just after the raised alumina goes into the air mixing room 10, it loses support of the casing 11 and, by the inertia of alumina, it leaves the chain conveyer 5 and gradually falls to the bottom plate of the air mixing room 10. At the same time the alumina intermingles with air. Since the bottom plate of the air mixing room 10 slopes towards the chute pipe 12, alumina can easily fall thereinto. By their accelerative falling, alumina grains can intermingle with enough amount of air and are supplied to the surface of the bath uniformly from the extremity of the chute pipe 12. After charging the fixed amount of alumina, the chain conveyer 5 may be stopped by turning off the motor 7, and the chute pipe 12 is placed back to its original position. Then, the alumina charging truck is ready for the charge at the next pot.

Instead of the chain conveyer, any machine for lifting alumina can be used. However, when chain conveyer is used, as shown in drawings, a uniform quantity of alumina can be lifted continuously, and therefore, the quantity of alumina introduced into pot can easily be measured. This is a very important industrial advantage.

The alumina charging truck according to the present invention has wonderful effects for charging of alumina to the pots by its large carrying capacity of alumina, in spite of a simple structure.

Although the invention has been described in its preferred form, it is understood that the present disclosure has been made only by way of example, and that changes in the details of construction and the combination and arrangements of parts may be resorted to without departing from the spirit and the scope of the invention as hereinafter claimed.

We claim:

1. A vehicle for conveying bulk material comprising a mobile body having a normal unloaded center of gravity, a hopper mounted on said body with its lower part below said unloaded center of gravity of said mobile body, an air mixing chamber having a material discharge at its lower end but above the lower part of said hopper and carried by said vehicle, a conveyor having a material moving surface, a conveyor loading station at the bottom of said hopper, a housing of continuous uniform cross section surrounding said conveyor from the position of the loading station to said air mixing chamber, said conveyor material moving surface extending upwardly into said air mixing chamber so that the material may spill off and be aerated before falling to said discharge.

2. The structure of claim 1 characterized in that said conveyor passes vertically into the aerating chamber.

3. The structure of claim 1 characterized in that the bottom wall of said aerating chamber slopes to said discharge.

4. The structure of claim 1 characterized in that said discharge is a rotary valve with a spout which is closed when said spout is swung parallel to said vehicle.

5. The structure of claim 1 characterized in that said conveyor is of the drag type and is suspended at the top with spaced wheels at least one of which is employed to drive the conveyor, said lower intermediate part being suspended in an arc to permit the use of said continuous uniform cross-sectional housing.

6. A truck for charging alumina to aluminium reduction pots comprising, in combination, a truck, an alumina container having an outlet at the bottom thereof installed on said truck, a room for mixing alumina with air provided at the upper part of said alumina container and having a bottom with a discharge, a machine for lifting alumina from said outlet into the room above the discharge thereof, a chute pipe fitted to the discharge of said room for charging alumina to the aluminium reduction pots, swivel means for changing the direction of said chute pipe, and a cock on said swivel means which opens or closes automatically depending upon the angle of the chute pipe relative to said truck.

References Cited in the file of this patent

UNITED STATES PATENTS

| | | |
|---|---|---|
| 789,135 | Baggaley | May 9, 1905 |
| 906,187 | Bittrich | Dec. 8, 1908 |
| 1,195,838 | Morgan | Aug. 22, 1916 |
| 2,305,447 | De L. Sinden | Dec. 15, 1942 |
| 2,347,437 | Saxe | Apr. 25, 1944 |
| 2,382,810 | Otto | Aug. 14, 1945 |
| 2,573,193 | Goldsberry | Oct. 30, 1951 |
| 2,701,073 | Padille | Feb. 1, 1955 |